UNITED STATES PATENT OFFICE.

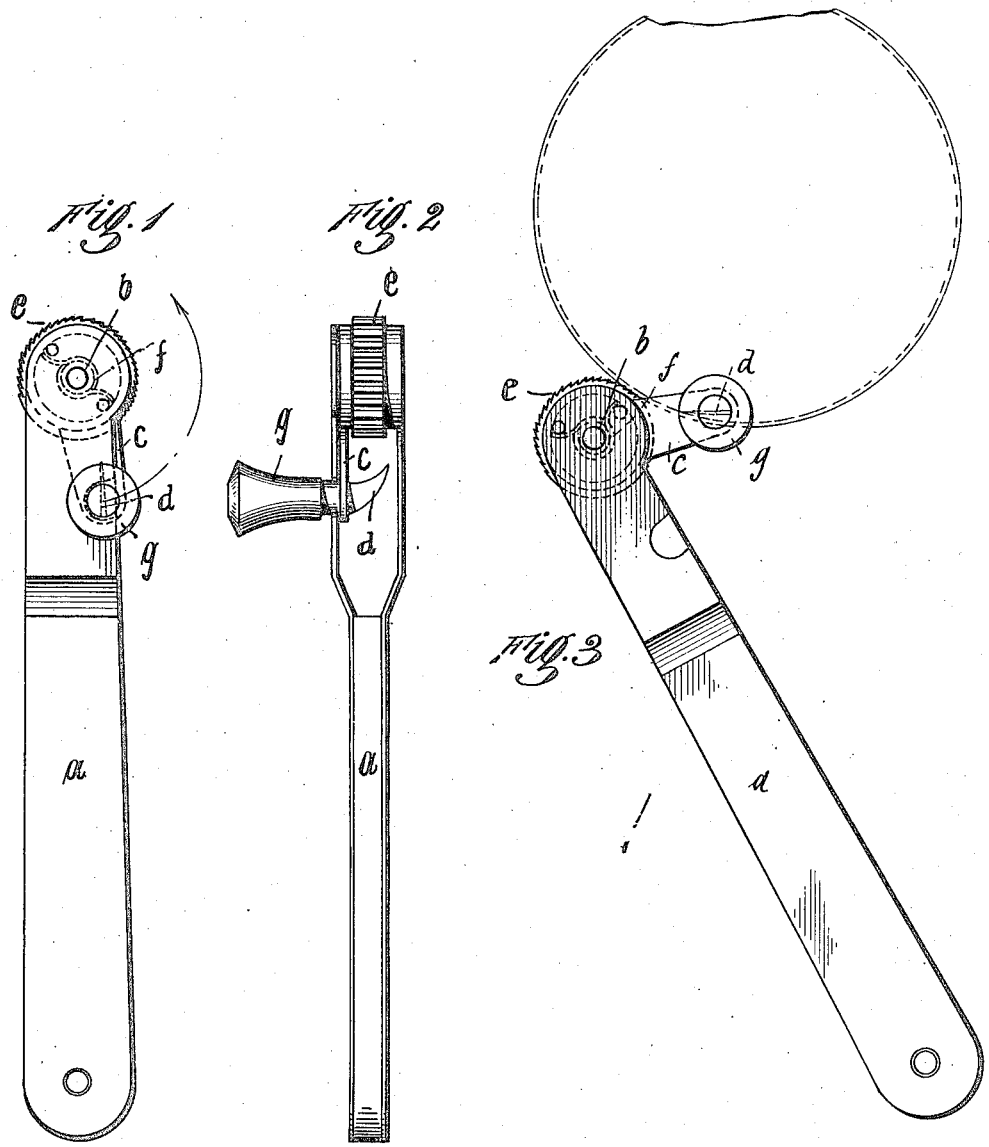

GUSTAV KRACHT, OF SOLINGEN, GERMANY.

TIN-OPENER.

1,399,061. Specification of Letters Patent. Patented Dec. 6, 1921.

Application filed January 17, 1913. Serial No. 742,553.

(GRANTED UNDER THE PROVISIONS OF THE ACT OF MARCH 3, 1921, 41 STAT. L., 1313.)

*To all whom it may concern:*

Be it known that I, GUSTAV KRACHT, a subject of the German Emperor, and resident of Solingen, Germany, have invented certain new and useful Improvements in Tin-Openers, of which the following is a specification.

This invention relates to an improved tin-opener with means for drawing the cutting blade of the same, when driven into the cover of the tin to be opened, firmly toward the edge of the cover during its cutting action in such a way that the sharp cutting edge of the tin is turned down, whereby a neat cutting-out of the cover is effected.

The accompanying drawing shows the improved tin-opener.

Figures 1 and 2 are respectively a plan view and side view of the same in its position of rest, while Fig. 3 is a plan view of the same in its position of use, showing how the tin-opener is applied to the tin to be opened.

The fork-shaped end of a handle $a$ carries on a pivot $b$ an arm $c$, which at its free end is fitted with the downwardly projecting cutting blade $d$. Further, the handle carries on its pivot-end a stationary toothed wheel $e$, which serves as a butt-bearing, in a way known in the art.

If the tin-opener is not in use, the arm $c$ is continuously pressed toward the handle by a torsion spring $f$ or the like, so that its cutting blade, as shown in Fig. 2, is placed between the forked members of the handle and thus prevented from being damaged or from damaging a person intending to use the same.

For intended use of the tin-opener, the arm $c$ is, by means of a button $g$ arranged thereon for this purpose, turned in the direction of the arrow (Fig. 1) so far away from the handle that, by a blow or pressure on said button, the cutting-blade can be driven into the cover of the tin to be opened, the toothed wheel $e$ bearing then against the side wall of the tin (Fig. 3). Upon the handle being moved to and fro in ratchetlike manner, the lever action of same causes during the active stroke of the handle the cutting blade to be firmly drawn toward the edge of the cover, so that the latter is cut open close to its edge. As the handle acts like a lever, cutting is effected with a very small expenditure of power.

I claim:

In a tin-opener, the combination of a forked handle, having a butt-bearing, an arm pivoted to said handle, a cutting blade carried by said arm, a spring to turn said blade into the forked handle when not in use, and a button on said arm to turn the blade into its operative position, substantially as and for the purpose set forth.

In testimony whereof I have hereunto set my hand in the presence of two subscribing witnesses.

GUSTAV KRACHT. [L. S.]

Witnesses:
  HELEN NUFER,
  ALBERT NUFER.